US011409714B2

(12) United States Patent
Driesch, Jr. et al.

(10) Patent No.: US 11,409,714 B2
(45) Date of Patent: Aug. 9, 2022

(54) EVALUATING PENDING OBJECT REPLICATION RULES

(71) Applicant: International Business Machines Corporation, Armonk, NY (US)

(72) Inventors: Robert D. Driesch, Jr., Rochester, MN (US); Robert V. Downer, Rochester, MN (US); Mi Huynh, Rochester, MN (US); John D. Dietel, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 586 days.

(21) Appl. No.: 16/449,263

(22) Filed: Jun. 21, 2019

(65) Prior Publication Data

US 2020/0401560 A1 Dec. 24, 2020

(51) Int. Cl.
*G06F 16/20* (2019.01)
*G06F 16/182* (2019.01)
*G06F 11/30* (2006.01)
*G06F 11/07* (2006.01)

(52) U.S. Cl.
CPC ...... *G06F 16/1844* (2019.01); *G06F 11/0781* (2013.01); *G06F 11/3075* (2013.01)

(58) Field of Classification Search
CPC ............. G06F 16/1844; G06F 11/0781; G06F 11/3075
See application file for complete search history.

(56) References Cited

U.S. PATENT DOCUMENTS

| | | | |
|---|---|---|---|
| 8,121,979 B2 | 2/2012 | Wakefield | |
| 8,838,529 B2 * | 9/2014 | Anglin | G06F 16/27 707/610 |
| 9,330,106 B2 | 5/2016 | Piasecki et al. | |
| 9,921,776 B2 | 3/2018 | McBride et al. | |
| 10,073,856 B1 * | 9/2018 | Cooper | G06F 16/1844 |
| 2007/0100903 A1 * | 5/2007 | Cherry | G06F 8/71 |
| 2012/0278282 A1 * | 11/2012 | Lu | G06F 16/273 707/634 |
| 2013/0158253 A1 | 6/2013 | Ottonello et al. | |
| 2014/0095435 A1 * | 4/2014 | Sayed | G06F 16/27 707/634 |
| 2014/0379922 A1 * | 12/2014 | Xiao | H04L 47/215 709/226 |
| 2017/0351699 A1 * | 12/2017 | Queromes | G06F 16/122 |
| 2018/0091517 A1 * | 3/2018 | Fury Christ | G06F 21/6209 |
| 2020/0134052 A1 * | 4/2020 | Natanzon | G06F 16/1844 |

* cited by examiner

*Primary Examiner* — Tarek Chbouki
(74) *Attorney, Agent, or Firm* — Patterson + Sheridan, LLP

(57) ABSTRACT

Techniques for replication rule evaluation are provided. A replication rule is received at a first node of a plurality of nodes where the replication rule defines object replication among the plurality of nodes. The replication rule is labeled as pending, where a second replication rule on the first node is labeled as active. Upon receiving a request to predict an effect of the replication rule, a first object of a plurality of objects is identified based on the first replication rule. Upon determining that the first object is present on the first node but is not present on a second node of the plurality of nodes, an indication of the first object is outputted.

20 Claims, 5 Drawing Sheets

400

| GROUP: TEST RULES | | | 405 |
|---|---|---|---|
| RULE: | VALID? | VIEW? | |
| RULE1 | Y | X | |
| RULE2 | N | X | |
| RULE3 | Y | X | |
| ⋮ | ⋮ | ⋮ | |
| RULEN | Y | X | |

| NODE 1 | | 410 |
|---|---|---|
| OBJECT: | CHANGE: | |
| OBJECT1 | TO BE MIRRORED | |
| OBJECT2 | MIRRORING SEVERED | |
| OBJECT3 | TO BE RECONNECTED | |
| ⋮ | ⋮ | |
| OBJECTM | TO BE MIRRORED | |

| NODE 2 | | 415 |
|---|---|---|
| OBJECT: | CHANGE: | |
| OBJECT2 | MIRRORING SEVERED | |
| OBJECT3 | TO BE RECONNECTED | |
| OBJECT4 | TO BE MIRRORED | |
| ⋮ | ⋮ | |
| OBJECTP | TO BE MIRRORED | |

FIG. 4

EVALUATING PENDING OBJECT REPLICATION RULES

BACKGROUND

The present disclosure relates to object replication, and more specifically, to labeling and evaluating replication rules in distributed systems.

In mirroring environments, two or more computing nodes can be configured to replicate objects between them, in order to provide a backup of the data. In some systems, the objects to be replicated are determined using a set of rules to identify objects (or groups of objects) that should be replicated. When a rule is added or removed, however, a large amount of bandwidth may be required, and the rule change may require a lengthy response time, depending on the number of objects that are affected by the rule. For example, if a rule causes a large number of previously un-mirrored objects to be copied, these objects must all be replicated and transmitted to the second node, which can consume significant resources. Further, if a rule change causes replication to be severed with respect to a given object, the nodes may become out of sync, with respect to the object. This severing is frequently not reversible.

Existing solutions provide generic data replication, but do not address or mitigate the effects of erroneous or mistaken replication. For example, U.S. Pat. No. 8,121,979 to Wakefield describes a replication and synchronization mechanism" that "merges changes that have been made independently as a result of the loss of communication between peers." This may aid remediation of some mistakes, but cannot prevent them. Similarly, U.S. Application Publication No. 201/30159253A1 to Dewall et. al. describes "instantiat[ing] the replication environment" using "policy declaration." This may help ease the process of defining policies, but does not prevent wasted computing resources. Although discussing replication in general, existing solutions do not identify or prevent accidental or erroneous replication.

SUMMARY

According to one embodiment of the present disclosure, a method is provided. The method includes receiving, at a first node of a plurality of nodes, a first replication rule, wherein the first replication rule defines object replication among the plurality of nodes. The method further includes labeling the first replication rule as pending, wherein a second replication rule on the first node is labeled as active. Additionally, the method includes upon receiving a request to predict an effect of the first replication rule, identifying, based on the first replication rule, a first object of a plurality of objects. Upon determining that the first object is present on the first node but is not present on a second node of the plurality of nodes, the method also includes outputting an indication of the first object. One advantage of the method is to identify relevant objects without modifying their replication status, which reduces latency and improves efficiency of the system.

In a further embodiment, the method includes receiving approval of the first replication rule. Upon receiving the approval, the method includes labeling the first replication rule as active. Additionally, upon labeling the first replication rule as active, the method includes replicating the first object to the second node. Advantageously, this allows the effects of a rule to be evaluated, and the rule to be approved, prior to activating it or changing any object replication in the system. This reduces the probability of accidental replication changes, and reduces bandwidth required to implement rule changes.

In another embodiment, the method further includes replicating the first replication rule to the second node of the plurality of nodes. Advantageously, this enables the rules themselves to be replicated between nodes, which reduces the probability that pending rules will be lost in the event of a system outage. Further, replicating the rules between nodes enables users to view, modify, and otherwise interact with the pending rules, regardless of which node they are currently interacting with.

In still another embodiment, the method additionally includes, upon receiving the request to predict the effect of the first replication rule, forwarding, to the second node, the request to predict the effect of the first replication rule. The method also includes receiving, from the second node, an indication of a second object that is present on the second node. Further, the method includes determining that the second object is not present on the first node, and outputting an indication of the second object. Advantageously, this allows the system to identify affected objects on any given node, without actually modifying the replication of any such object.

According to yet another embodiment of the present disclosure, the method includes receiving a plurality of replication rules, and labeling each respective replication rule of the plurality of replication rules as pending, wherein each respective replication rule is further labeled with a first group identifier. Upon receiving a request to predict an effect of the first group identifier, the method includes identifying, based on the plurality of replication rules, one or more objects of the plurality of objects, and outputting an indication of the one or more objects. Advantageously, this allows multiple replication rules to be modified and designed simultaneously, such that the combined effects of the rules can be identified without activating or implementing any individually.

In another embodiment, the method additionally includes prior to identifying the first object, validating the first replication rule based on one or more cross-dependencies. Advantageously, this enables the rules to be validated for internal consistency prior to activation. This can prevent accidentally implementing one or more rules that conflict.

In yet another embodiment, the method includes outputting a graphical user interface (GUI) depicting the first object on the first node. Advantageously, this GUI enables users to quickly and readily visualize the effects of a given rule change, which further reduces the probability of unintentional replication. This reduces wasted bandwidth and latency.

According to another embodiment of the present disclosure, a computer-readable storage medium is provided. The computer-readable storage medium has computer-readable program code embodied therewith, the computer-readable program code executable by one or more computer processors to perform an operation. The operation includes receiving, at a first node of a plurality of nodes, a first replication rule, wherein the first replication rule defines object replication among the plurality of nodes. The operation further includes labeling the first replication rule as pending, wherein a second replication rule on the first node is labeled as active. Additionally, the operation includes upon receiving a request to predict an effect of the first replication rule, identifying, based on the first replication rule, a first object of a plurality of objects. Upon determining that the first object is present on the first node but is not present on a second node of the plurality of nodes, the operation also includes outputting an indication of the first object. One advantage provided by the computer-readable storage medium enables identifying relevant objects without modifying their replication status, which reduces latency and improves efficiency of the system.

According to yet another embodiment of the present disclosure, a system is provided. The system includes one or more computer processors, and a memory containing a program which when executed by the one or more computer processors performs an operation. The operation includes receiving, at a first node of a plurality of nodes, a first replication rule, wherein the first replication rule defines object replication among the plurality of nodes. The operation further includes labeling the first replication rule as pending, wherein a second replication rule on the first node is labeled as active. Additionally, the operation includes upon receiving a request to predict an effect of the first replication rule, identifying, based on the first replication rule, a first object of a plurality of objects. Upon determining that the first object is present on the first node but is not present on a second node of the plurality of nodes, the operation also includes outputting an indication of the first object. One advantage provided by the system enables identifying relevant objects without modifying their replication status, which reduces latency and improves efficiency of the system.

BRIEF DESCRIPTION OF THE SEVERAL VIEWS OF THE DRAWINGS

FIG. 4 illustrates a graphical user interface to allow users to define and evaluate pending replication rules in a distributed system, according to one embodiment disclosed herein.

DETAILED DESCRIPTION

Figure 1:
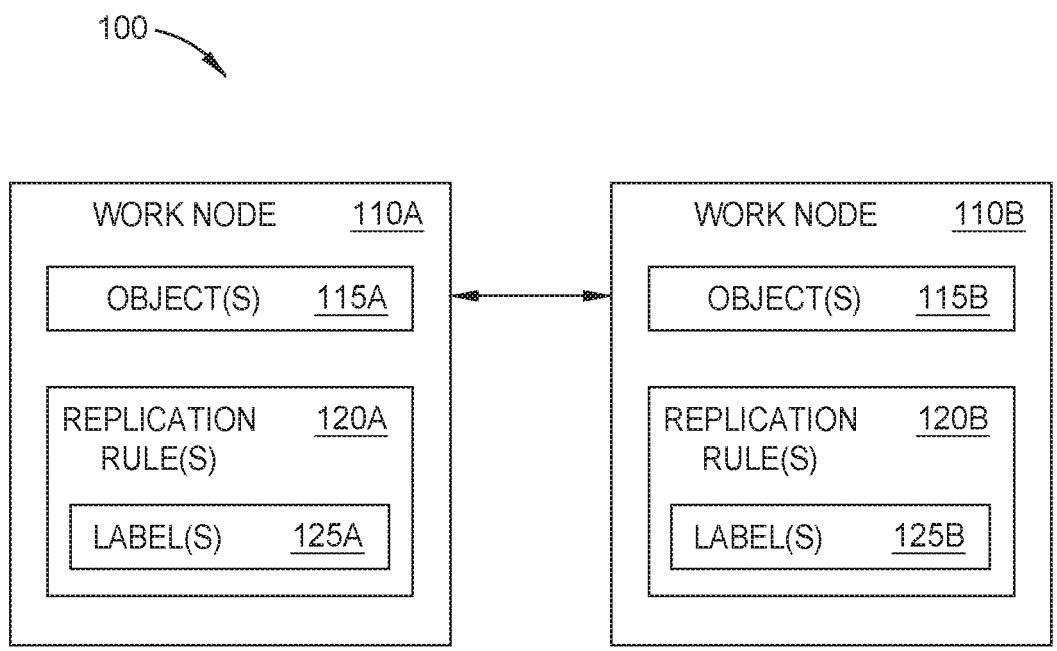
FIG. 1 illustrates a system configured to prototype object replication rules in a distributed environment, according to one embodiment disclosed herein.

Embodiments of the present disclosure provide techniques to prototype or evaluate replication rules to determine their effect on a mirroring system, without activating and carrying out the replication changes. That is, embodiments of the present disclosure enable rule changes to be treated as if they are being actively applied to the replicated rule set, and enables determination of the changes in object replication that are caused by the impending changes, without actually changing the current object replication. For example, rather than replicating objects and/or severing replication between nodes, embodiments of the present disclosure enable the system to predict the effects of the rule(s) changing. Notably, in an embodiment, the affected objects and nodes are not modified (e.g., replication is not added or severed) until the rule is validated and approved. In this way, embodiments of the present disclosure can advantageously prevent erroneous or unintentional replication changes from taking effect.

For example, if a user mistakenly defines a rule that will cause a large number of objects to be replicated, embodiments of the present disclosure allow the user to identify and remedy this mistake, prior to beginning the replication. This prevents waste of bandwidth and other computing resources. Similarly, if a user mistakenly defines a rule that severs mirroring with respect to one or more objects, embodiments of the present disclosure enable the user to correct the rule prior to implementation. This allows the objects to remain synchronized, and prevents costly and resource-intensive corrections should the rule be implemented incorrectly.

In existing systems, each rule becomes active as soon as they are defined. In some embodiments of the present disclosure, potential rule changes are represented in the system using a label within the set of rules that marks them as pending or deferred entries. In one embodiment, multiple rules can be labeled and deferred under a common group identifier, allowing the system to evaluate the effect of a collection of rules simultaneously. In an embodiment, any number of label groups can be utilized, each with any number of pending rules. This can enable users to control their own labels or rules (without affecting the system behavior, or changing the rules being evaluated by other users). In some embodiments, each application in the replicated system can use a unique label, such that replication rules can be evaluated at various levels of granularity and specificity, for each user and/or application.

In one embodiment, replication rules are themselves replicated to other node(s) in the system. In an embodiment, the deferred entries are similarly replicated across to the target node(s). This can give users the ability to change and manage deferred entries on either node. In some embodiments, managing these deferred entries involves querying the set of rules to identify deferred entries using a specified label. As each deferred group is independent of the others, changing entries in a given group will not affect the potential replication of objects in any other group. Additionally, changing deferred entries does not affect active entries or change object replication. Further, in one embodiment, as both pending rules and active rules can be added or removed from the set, the system can automatically manage and maintain the separation of these rules for users.

In embodiments, the system allows users to preview or see a "what-if" evaluation of the deferred entries in a label group. This allows users to determine whether the deferred changes will have the desired impact, and the change in replication of objects affected by the rules in the label group can be modeled and predicted for the user. Notably, in an embodiment, this action is not performance critical, in that it does not require the bandwidth, resources, and response time that is required to actually activate the rules. This is because the pending rules are only treated as if they were to be effective immediately, but are not actually activated. In some embodiments, the set of rules in a label group can be validated to check for any errors, and this validation is reported to users before the group is applied, in order to minimize unnecessary operational costs which can ineffectually lead to erroneous solutions. Embodiments of the present disclosure therefore allow users to add and remove deferred entries in pending group, and prototype potential rule changes, as many times as needed in order to achieve the desired change of object replication. The impact on object replication when these potential rules are applied will therefore be robust, and erroneous replication or severing of replication is prevented.

FIG. 1 illustrates a system 100 configured to prototype object replication rules in a distributed environment, according to one embodiment disclosed herein. In the illustrated embodiment, two Work Nodes 110A and 110B are depicted. Although two Work Nodes 110 are illustrated, in embodiments, there may of course be any number of nodes in the system 100. Further, although some replication between two nodes is used as an example, in embodiments, objects may be replicated between any number of nodes in the system 100. In one embodiment, replication for a given object means copying that object from a first node to one or more other nodes (sometimes referred to as target nodes). In some embodiments, if an object on a first node is "replicated" to a second node, the copy of the object on each node is kept synchronized. That is, if the object changes or is modified on a first node, the change is similarly applied to the object on the second node.

In some embodiments, each Work Node 110 can include any number of Objects 115. Objects 115 generally include any data structure, including rows, sections, or tables of a database, entire databases or libraries, files, and the like. In the illustrated embodiment, the Work Node 110A has a first set of Objects 115A, while the Work Node 110B has a different set of Objects 115B. In some embodiments, one or more of the Objects 115 may be replicated and synchronized across both Work Nodes 110A-B, while other Objects 115 may be unique to a given Work Node 110A-B. As illustrated, the Work Node 110A has a set of Replication Rules 120A, while the Work Node 110B has a set of Replication Rules 120B. In embodiments, the Replication Rules 120A-B are used to identify objects that are to be replicated between given nodes.

In embodiments, the Replication Rules 120 can be any level of specificity or granularity. The rules may specify particular files or data Objects 115, a group of Objects 115 (e.g., based on the library or folder they are associated with), and the like. In some embodiments, the Replication Rules 120 can be used to identify relevant Objects 115 based on other aspects or metadata associated with each Object 115. Generally, the Replication Rules 120 can include any criteria or information that can be used to determine whether a given Object 115 is included within the scope of the rule. That is, in an embodiment, each Replication Rule 120 can be iteratively matched against each Object 115 to determine, for each Object 115, whether the Replication Rule 120 applies. In one embodiment, each Object 115 can similarly be matched against the set of Replication Rules 120 to identify which rule(s), if any, apply to the Object 115.

In some embodiments, if no Replication Rule 120 applies to a given Object 115, the Object 115 is not replicated to any other node. That is, in some embodiments, the default option is no replication or mirroring, and the Replication Rules 120 are used to define which Object(s) 115 should be mirrored. In another embodiment, the default rule is that all Objects 115 are mirrored to one or more other nodes, and the Replication Rules 120 define objects for which mirroring should not be used. In an embodiment, each Replication Rule 120 can enforce replication, sever replication, or both for any combination of objects. In some embodiments, the Replication Rules 120 can further identify one or more Work Nodes 110 on which the relevant Objects 115 should be replicated.

In some embodiments, if an Object 115 is to be replicated (e.g., replication is beginning), a copy of the Object 115 is created and transmitted to the identified target node. The Objects 115 are then kept synchronized across the nodes. In one embodiment, if replication is to be severed with respect to an Object 115 (e.g., to two or more copies of an Object 115 on separate Work Nodes 110), the synchronization between the nodes is no longer performed, with respect to the severed Object 115. In some embodiments, the copy of the Object 115 is further deleted or removed from one or more of the target Work Node(s) 110. In an embodiment, if replication is subsequently re-enabled for the Object 115, the system 100 again copies it to the target node(s). That is, in some embodiments, the replication link cannot be re-added, and the object must be copied again. In some embodiments, the system 100 can determine that the Object 115 was previously replicated, evaluate the two copies to determine whether they remain identical, and reconnect the synchronization (e.g., without copying the data again) if they have not changed.

In one embodiment, the Replication Rules 120 are themselves replicated between Work Nodes 110. In one embodiment, each Replication Rule 120 is replicated to all other Work Nodes 110 in the system. In such an embodiment, the Replication Rules 120 can be modified or evaluated on any Work Node 110. In another embodiment, a given Replication Rule 120 is replicated only between the relevant Work Nodes 110. For example, in an embodiment, each Replication Rule 120 that instructs nodes to replicate objects specifies two or more Work Nodes 110, and any Objects 115 implicated by the Replication Rule 120 are replicated between the specified Work Nodes 110. In an embodiment, this Replication Rule 120 will therefore be similarly replicated between the identified Work Nodes 110. Similarly, if a Replication Rule 120 severs replication between objects on two or more nodes, it can specify the relevant nodes and be replicated between these nodes.

In the illustrated embodiment, each Replication Rule 120 is associated with a corresponding Label 125. In embodiments, this Label 125 may be represented in metadata associated with the Replication Rule 120, as a field or other data structure in the Replication Rule 120, and the like. In one embodiment, the Label 125 indicates whether the corresponding Replication Rule 120 is "active" or "pending" (also referred to as deferred, inactive, and the like). In an embodiment, an "active" Replication Rule 120 is currently being used to define the replication of Objects 115 on the Work Node 110, while a "pending" or "deferred" Replication Rule 120 is one that has no effect on the object replication. In some embodiments, all Replication Rules 120 begin in a "pending" state, until they are validated and/or evaluated and approved. Once approved, the pending rule becomes an "active" Replication Rule 120, and is implemented on the system 100.

In an embodiment, implementing a given Replication Rule 120 (e.g., changing the rule from "pending" to "active") causes the system 100 to identify the relevant Objects 115 on one or more Work Nodes 110 that are affected by the rule change, and begin mirroring (or sever mirroring) to the indicated target Work Node(s) 110. In some embodiments, the Label 125 can further specify a group or collection to which the corresponding Replication Rule 120 belongs. For example, the group may identify a specific user or application, or any other logical collection (such as rules related to a particular project or change to the system 100). In this way, the system 100 can be used to evaluate groups of Replication Rules 120 collectively, in order to determine the effect they will have. The group of rules can then be implemented simultaneously, in some embodiments.

Figure 2:
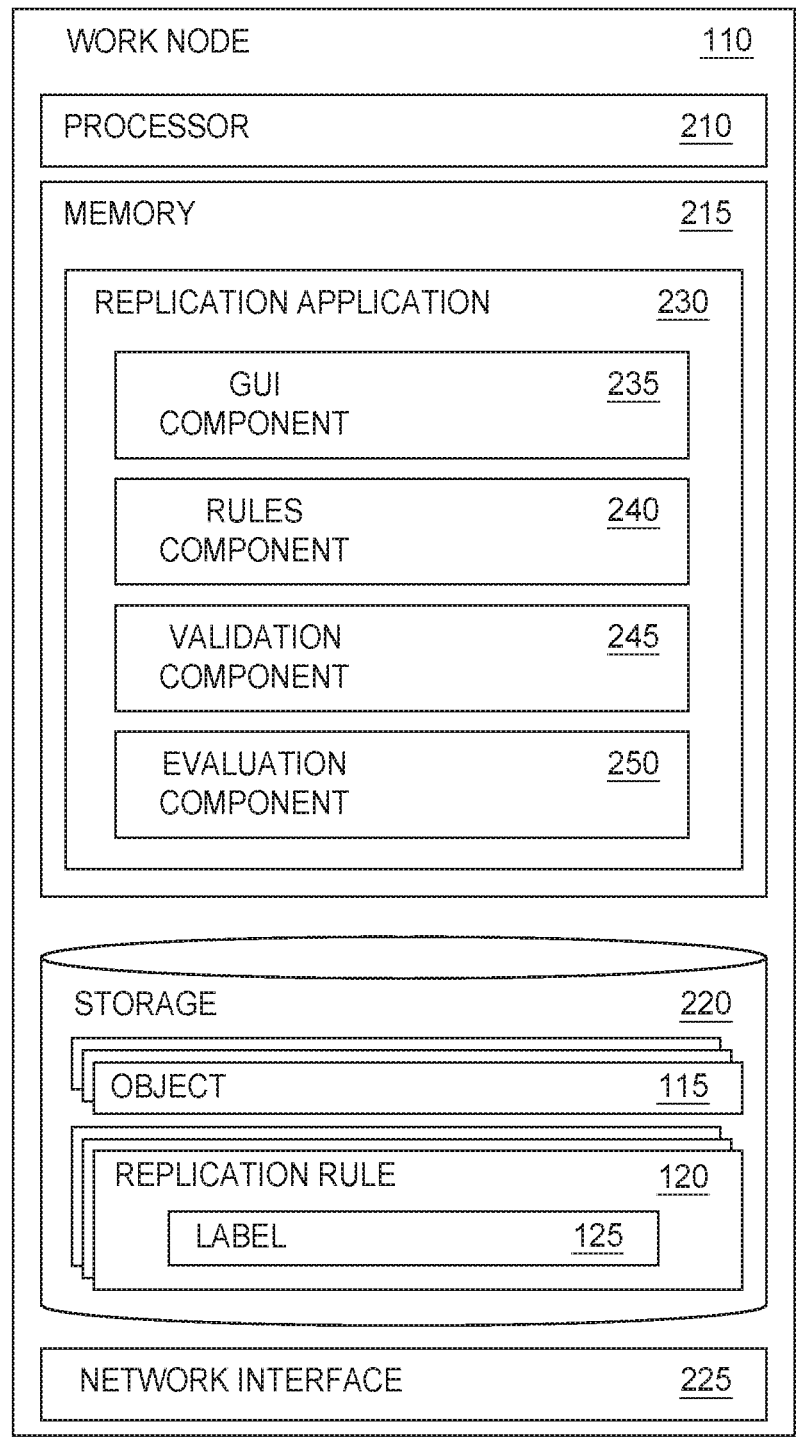
FIG. 2 is a block diagram illustrating a work node configured to evaluate replication rules prior to their implementation, according to one embodiment disclosed herein.

FIG. 2 is a block diagram illustrating a Work Node 110 configured to evaluate replication rules prior to their implementation, according to one embodiment disclosed herein. In the illustrated embodiment, the Work Node 110 includes a Processor 210, Memory 215, Storage 220, and a Network Interface 225. In the illustrated embodiment, the Processor 210 retrieves and executes programming instructions stored in Memory 215, as well as stores and retrieves application data residing in Storage 220. The Processor 210 is generally representative of a single CPU, multiple CPUs, a single CPU having multiple processing cores, and the like. The Memory 215 is generally included to be representative of a random access memory. Storage 220 may be disk drives or flash-based storage devices, and may include fixed and/or removable storage devices, such as fixed disk drives, removable memory cards, or optical storage, network attached storage (NAS), or storage area network (SAN). Via the Network Interface 225, the Work Node 110 can be communicatively coupled with one or more other devices and components, such as other Work Nodes 110, monitoring nodes, storage nodes, and the like.

In the illustrated embodiment, the Storage 220 includes a set of Objects 115, and a set of Replication Rules 120. Although depicted as residing in Storage 220, in embodiments, the Objects 115 and Replication Rules 120 may reside in any suitable location. In embodiments, the Objects 115 are generally representative of any data (e.g., application data, saved files, databases, and the like) that is maintained and/or operated on by the Work Node 110. As illustrated, the Memory 215 includes a Replication Application 230. Although depicted as software in Memory 215, in embodiments, the functionality of the Replication Application 230 can be implemented in any location using hardware, software, or a combination of hardware and software. Although not illustrated, the Memory 215 may include any number of other applications used to create and modify the Objects 115 and perform work on the Work Node 110.

As illustrated, the Replication Application 230 includes a GUI Component 235, a Rules Component 240, a Validation Component 245, and an Evaluation Component 250. Although depicted as discrete components for conceptual clarity, in embodiments, the operations and functionality of the GUI Component 235, Rules Component 240, Validation Component 245, and Evaluation Component 250 may be combined or distributed across any number of components. In an embodiment, the Replication Application 230 is generally used to configure, implement, and manage the replication of Objects 115 from the Work Node 110 to one or more other target nodes, as well as from other nodes to the Work Node 110.

In an embodiment, the GUI Component 235 is used to generate and output graphical user interfaces (GUIs) for users, as well as receive input from users. In one embodiment, users can use the GUI Component 235 to define newly proposed Replication Rules 120, as well as to modify or delete existing ones. In some embodiments, the GUI Component 235 automatically flags all new, modified, or removed rules as "pending," until they have been evaluated. That is, when a user introduces a new Replication Rule 120 or modifies or deletes an existing Replication Rule 120, the Replication Application 230 does not immediately implement the change. Instead, the rule is labeled as deferred.

In some embodiments, the displayed GUI indicates the current status of each Replication Rule 120, and/or each Object 115 on one or more Work Nodes 110. For example, with respect to Replication Rules 120, the GUI Component 235 can indicate whether the rule is currently active, whether the rule has passed validation, whether the rule has been evaluated, what group identifier(s) the rule belongs to, and the like. In some embodiments, the GUI Component 235 also illustrates what Object(s) 115 are implicated or affected by each Replication Rule 120. Further, with respect to the Objects 115, in one embodiment, the GUI Component 235 indicates what Work Node(s) 110 the Object 115 is present on, whether replication is active between any given nodes, what Replication Rule(s) 120 affect replication of the Object 115, and the like.

In one embodiment using the GUI Component 235, the user can request that a Replication Rule 120 (or set of Replication Rules 120) be validated and/or evaluated. In an embodiment, validation refers to checking for contradictions and cross-dependencies that the proposed rule(s) may violate, while evaluation includes identifying the Objects 115 which will have their replication status changed by the deferred rule(s). For example, if a given Object 115 is already being replicated to a target Work Node 110 and the proposed change will sever this link, the GUI Component 235 can indicate this severing. Similarly, if the rule will cause the Object 115 to be replicated to one or more target Work Nodes 110 that it was not previously replicated to, the GUI Component 235 will output this information.

In some embodiments, if an Object 115 is included within the definitions provided by the Replication Rule 115, but the replication status of the Object 115 will not change, the GUI Component 235 does not highlight or otherwise indicate this Object 115. For example, if an Object 115 is already replicated to a target Work Node 110 and the proposed rule would cause it to be replicated to the same target Work Node 110, the GUI Component 235 can refrain from flagging the Object 115 as "affected" by the proposed Replication Rule 120 because its status will not change. In some embodiments, the GUI Component 235 can display the Object 115 as relevant, but unchanged.

In some embodiments, the affected Objects 115 are highlighted or otherwise emphasized in the GUI, as compared to unaffected Objects 115. For example, an unaffected Object 115 may be white, while affected Objects 115 are highlighted in red. In an embodiment, relevant but unchanged Objects 115 may be displayed differently, such as with yellow highlighting. Further, in some embodiments, the method of display differs based on the effect. For example, in such an embodiment, an Object 115 which will be replicated can be emphasized or organized in a first way, while Objects 115 which will have replication severed can be indicated in a different way.

In the illustrated embodiment, the Rules Component 240 receives information from the GUI Component 240 (e.g., input by a user) or other applications, and queries the Replication Rules 120. For example, a user may specify to retrieve a particular rule or all Replication Rules 120 with a given label (e.g., "User1"), or to identify all Replication Rules 120 affecting a given Object 115 (or set of objects). The Rules Component 240 then returns these Replication Rules 120 to the GUI Component 235, which outputs them for display. In some embodiments, the Rules Component 240 further adds new Replication Rules 120, modifies existing Replication Rules 120, and removes existing Replication Rules 120, depending on the received input. The Rules Component 240 can further generate and assign one or more Labels 125 to each Replication Rule 120, specifying the group it belongs to, whether it is active or deferred, and the like.

In an embodiment, the Validation Component 245 is used to validate one or more Replication Rules 120. In some embodiments, validating the Replication Rules 120 involves ensuring that any cross-dependencies will not be violated by a rule. For example, suppose the Replication Rule 120 attempts to initiate replication for an Object 115 that already exists on both nodes. If the system cannot determine conclusively that the severed Objects 115 are identical, the rule can be flagged as invalid. That is, the Replication Rule 120 is invalid because activating the rule in the current state would require copying one version of the non-identical Objects 115 to the other node, and deleting the contents of the Object 115 on the other node. This could result in the loss of user data. Thus, in an embodiment, this validation ensures user intervention is performed to dictate which version of the Object 115 is used for replication.

As another example of rule validation, the Validation Component 245 may check for conflicting rules. That is, because multiple groups of rules may be managed simultaneously, there is a Replication Rule 120 can be added and activated that invalidates a previously valid set of pending rules. This could be because, for example, an identical Replication Rule 120 is added and activated in the interim, causing a duplicate or conflicting rule scenario. Similarly, in an embodiment, the group may contain a pending removal of a rule that has (subsequently) already been removed, thus causing a failure to find an existing rule.

In one embodiment, the Evaluation Component 250 is used to preview the effect that a Replication Rule 120 (or group of rules) will have on replication of the Objects 115. In embodiments, this evaluation is performed prior to implementing the rule change. For example, in one embodiment, given a Label 125 or other method of identifying rules or groups of rules, the Evaluation Component 250 will identify any Objects 115 on the local Work Node 110 that may be affected by the rule. That is, the Evaluation Component 250 searches for Objects 115 that match the criteria specified by the Replication Rule 120. The Evaluation Component 250 can then determine the current replication status of each identified Object 115, and determine whether this status will change based on the proposed Replication Rule(s) 120.

In some embodiments, the Evaluation Component 250 further requests one or more remote Work Nodes 110 to identify Objects 115 present on the remote node that satisfy the rule criteria, and return an indication of the current replication status of each such Object 115. Notably, in one embodiment, the remote nodes do not transmit the Objects 115 themselves. Instead, the remote Work Nodes 110 can return information about the affected objects, such as an indication of the affected Objects 115 (e.g., an identifier of each), and other characteristics (such as their size). In this way, the Evaluation Component 250 can predict the effects of a Replication Rule 120 without requiring significant bandwidth to actually implement the rule.

In some embodiments, in addition to identifying the affected Object(s) 115, the Evaluation Component 250 further determines an estimated impact of the change(s) in terms of compute resources. For example, given the set of Objects 115 that will be replicated (e.g., copied) if the changes are implemented, the Evaluation Component 250 can estimate the required bandwidth and/or latency to perform the replication. In some embodiments, this information is returned to the GUI Component 235 for display to the user. Users can then determine whether the proposed rule change(s) align with their intent, and approve or decline to implement the changes. In one embodiment, the user can select to delay activation of the rules (e.g., to a defined time). For example, if the rule changes are accurate but will require significant bandwidth, the user can request that the rule group be automatically implemented overnight or at another time.

Figure 3:
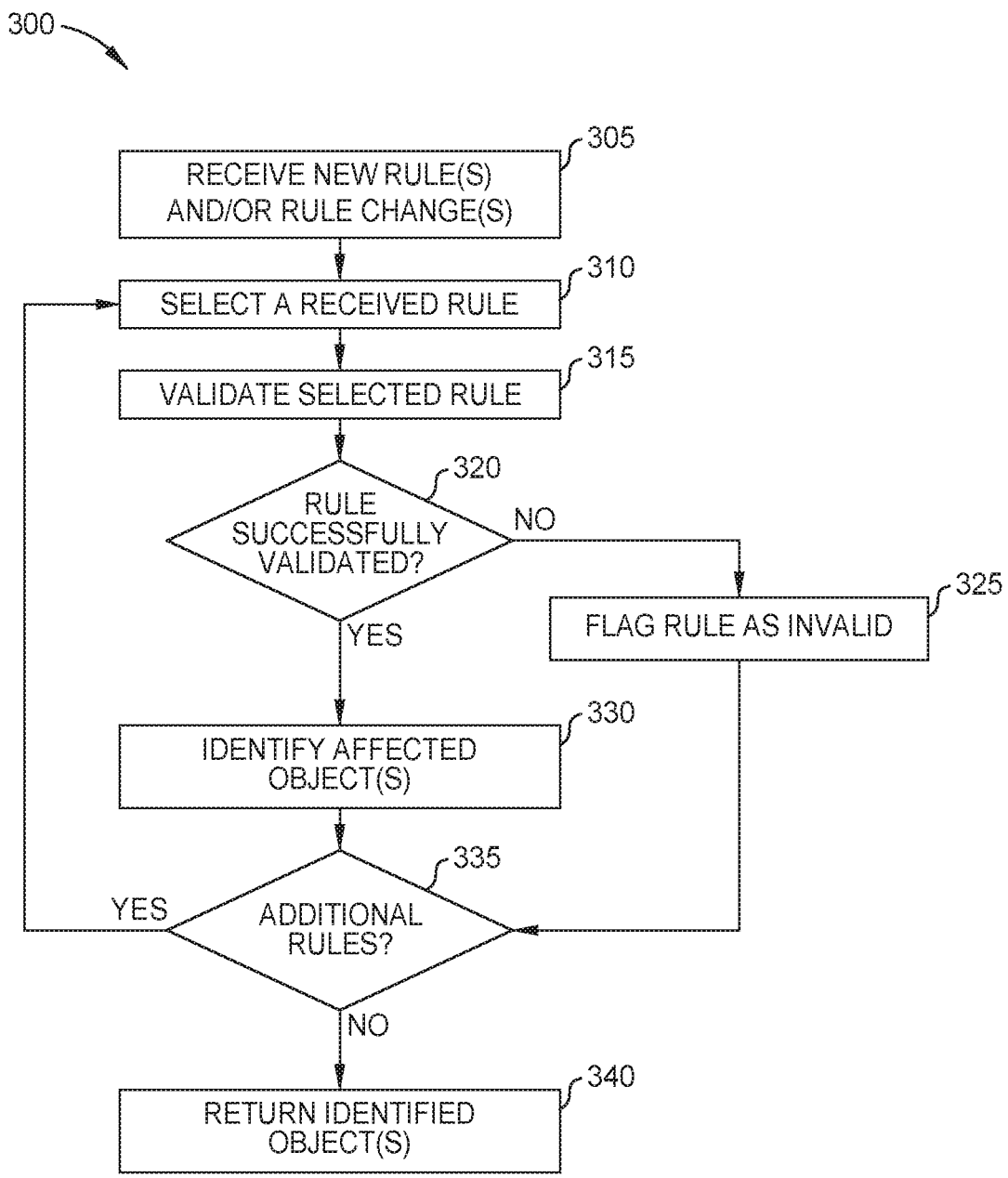
FIG. 3 is a flow diagram illustrating a method of evaluating replication rules pre-implementation, according to one embodiment disclosed herein.

FIG. 3 is a flow diagram illustrating a method 300 of evaluating replication rules pre-implementation, according to one embodiment disclosed herein. The method 300 begins at block 305, where a Replication Application 230 receives one or more new Replication Rules 120, and/or one or more changes to one or more existing Replication Rule(s) 120. As discussed above, in one embodiment, each proposed rule (or rule change) indicates criteria that can be used to identify Objects 115 that are affected by the rule. For example, the criteria can include a name, object type, a user or application that created or modified the object, a location of the object, and any other data that can be used to identify relevant Objects 115. Further, in an embodiment, each proposed rule indicates whether replication should be enabled or disabled for the affected objects. If replication is enabled, in one embodiment, the rule specifies to target work node(s) to which the object should be replicated. In some embodiments, each proposed rule also includes a priority that allows conflicting rules to be simultaneously applied (e.g., with higher-priority rules taking precedence over lower-priority rules). In one embodiment, the newly received rules and changes are labeled or flagged as pending or deferred.

The method 300 then proceeds to block 310, where the Replication Application 230 selects one of these received new or modified rules. At block 315, the Replication Application 230 validates the selected rule. For example, the Replication Application 230 may confirm that it does not violate defined cross-dependencies, or otherwise fail to satisfy any predefined criteria or requirements for replication rules in the system (e.g., a requirement that no single replication rule can invoke more than a predefined number of objects). At block 320, the Replication Application 230 determines whether the selected rule is valid. If not, the method 300 proceeds to block 325, where the Replication Application 230 flags the selected replication rule as invalid. The method 300 then proceeds to block 335, discussed in more detail below.

Returning to block 320, if the Replication Application 230 determines that the selected rule is valid, the method 300 continues to block 330, where the Replication Application 230 identifies any object(s) that are affected by the selected rule. In one embodiment, identifying affected objects includes searching the local Work Node 110 for Objects 115 satisfying the rule criteria. In some embodiments, this further includes requesting one or more remote Work Nodes 110 to search their local storage for relevant Objects 115. In some embodiments, at block 330, the Replication Application 230 identifies all Objects 115 that satisfy the defined criteria provided by the selected rule. In one embodiment, the Replication Application 230 further analyzes these identified Objects 115 to determine whether they will actually be affected (e.g., whether their replication status will change, based on the selected rule).

The method 300 then continues to block 335, where the Replication Application 230 determines whether there is at least one additional deferred rule to be analyzed. If so, the method 300 returns to block 310. Otherwise, the method 300 proceeds to block 340, where the Replication Application 230 returns the identified object(s). In one embodiment, this includes returning an indication or identifier of each object, such that a user can review the predicted results of the rule change(s) and determine whether to implement the changes. In some embodiments, the Replication Application 230 further returns information about the change overall, such as the amount of data that will be copied or replicated if the rules are approved, the bandwidth required (e.g., short term, to perform the initial copying, as well as long term, to continue the synchronization).

Based on this output, the user can determine whether to approve and implement the set of proposed rules. Advantageously, this allows users to test or evaluate replication rule changes without actually implementing them. This improves the system by preventing potential waste of bandwidth caused by erroneous or unintentional replication. Further, should replication be mistakenly severed, it may be impossible to automatically reapply the replication once synchronization is lost. In some embodiments, a user may manually review the objects to determine whether they should be synchronized (e.g., they are intended to be the same object), or not (e.g., they were or should remain as distinct objects).

FIG. 4 illustrates a graphical user interface 400 to allow users to define and evaluate pending replication rules in a distributed system, according to one embodiment disclosed herein. The illustrated GUI 400 includes an indication of a Group 405 of Replication Rules 120, as well as an Indication 410 and 415 of the Objects 115 on two Work Nodes 110. Specifically, the Group 405 corresponds to deferred or proposed Replication Rules 120 with a label of "Test Rules," which has been defined to prototype the set of rules before implementation. Further, the Indication 410 depicts the set of Objects 115 that are currently present on "Node1" and will be affected by the rules included in the Group 405, while the Indication 415 depicts the set of Objects 115 currently on "Node2" which will be affected by the rules.

As illustrated, the Group 405 includes a Rule1, a Rule2, a Rule3, and a RuleN. Of course, there may be any number of Replication Rules 120 included in a given label. In the illustrated GUI 400, the user can determine, for each Replication Rule 120 in the Group 405, whether to enable or disable predictions for the rule. This is depicted by the "View?" column of the Group 405. That is, in the illustrated embodiment, the user can selectively enable or disable rules in the Group 405, in order to see how each individual rule affects the predicted replication in the system. Further, in the illustrated embodiment, the Group 405 indicates, for each Replication Rule 120, whether the rule successfully passed validation. This is indicated by the "Valid?" column. Illustratively, all rules have passed validation except for Rule3, and the user has requested view the results of all of the rules in the Group 405.

In the illustrated GUI 400, the Replication Application 230 has determined that, if the Group 405 is implemented, "Object1," "Object2," "Object3," and "ObjectM" on Node1 will be affected. Specifically, "Object1" and "ObjectM" will have replication begin (e.g., they will be copied to Node2), while "Object2" will have replication severed (e.g., it will no longer be synchronized with the copy of Object2 on Node2). Further, "Object3" will have its replication reconnected. That is, because an identical Object3 was found on the Node2, the system will reconnect replication/synchronization. As further illustrated, the Replication Application 230 has determined that, if the Group 405 is implemented, "Object2," "Object4," "Object3," and "ObjectP" on Node2 will be affected. Specifically, "Object4" and "ObjectP" will have replication begin (e.g., they will be copied to Node1), while "Object2" will have replication severed (e.g., it will no longer be synchronized with the copy of Object2 on Node1). Further, "Object3" will be reconnected with the copy found on Node1.

In this way, the GUI 400 enables users to quickly view which Object(s) 115 will be affected, which Work Node(s) 110 the affected Object(s) 115 currently reside on, and the like. The user can thus readily modify one or more of the proposed rules (e.g., changing the criteria, priority, or replication result for a given rule), and/or disable/enable one or more of the proposed rules, until the predicted Indications 410 and 415 match the desired result. In an embodiment, the user can then approve the entire Group 405, such that the rules are implemented simultaneously in the system.

Figure 5:
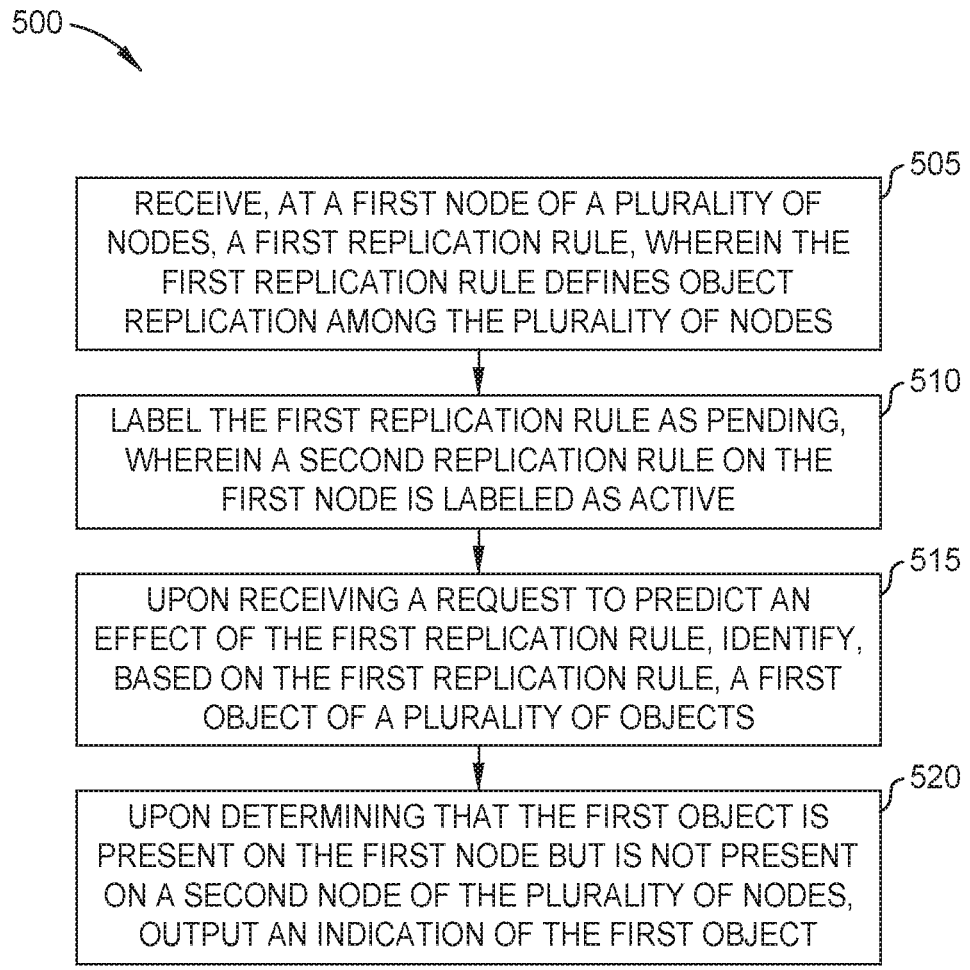
FIG. 5 is a flow diagram illustrating a method of evaluating an object replication rule, according to one embodiment disclosed herein.

FIG. 5 is a flow diagram illustrating a method 500 of evaluating an object replication rule, according to one embodiment disclosed herein. The method 500 begins at block 505, where a Replication Application 230 receives, at a first node of a plurality of nodes, a first replication rule, wherein the first replication rule defines object replication among the plurality of nodes. At block 510, the Replication Application 230 labels the first replication rule as pending, wherein a second replication rule on the first node is labeled as active. The method 500 then proceeds to block 515, where, upon receiving a request to predict an effect of the first replication rule, the Replication Application 230 identifies, based on the first replication rule, a first object of a plurality of objects. The method 500 continues to block 520, where the Replication Application 230 outputs an indication of the first object, upon determining that the first object is present on the first node but is not present on a second node of the plurality of nodes.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., a Replication Application 230) or related data available in the cloud. For example, the Replication Application 230 could execute on a computing system in the cloud and evaluate proposed replication rules. In such a case, the Replication Application 230 could prototype object replication and store rules and predicted effects at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:
   receiving, at a first node of a plurality of nodes, a first replication rule, wherein the first replication rule defines object replication among the plurality of nodes;
   labeling the first replication rule as pending, wherein a second replication rule on the first node is labeled as active;
   upon receiving a request to predict an effect of the first replication rule;
      identifying, based on the first replication rule, a first object of a plurality of objects;
      upon determining that the first object is present on the first node but is not present on a second node of the plurality of nodes, outputting an indication of the first object, to a user, on a graphical user interface (GUI);
      determining an amount of data that will be affected by the first replication rule, the amount of data including at least a size of the first object; and
      outputting an indication of the amount of data, to the user, on the GUI; and
   upon receiving, via the GUI, user approval of the first replication rule, labeling the first replication rule as active.

2. The method of claim 1, the method further comprising:
   upon labeling the first replication rule as active, replicating the first object to the second node.

3. The method of claim 1, the method further comprising replicating the first replication rule to the second node of the plurality of nodes.

4. The method of claim 3, the method further comprising:
   upon receiving the request to predict the effect of the first replication rule:
      forwarding, to the second node, the request to predict the effect of the first replication rule;
      receiving, from the second node, an indication of a second object that is present on the second node;
      determining that the second object is not present on the first node; and
      outputting an indication of the second object.

5. The method of claim 1, the method further comprising:
   receiving a plurality of replication rules;
   labeling each respective replication rule of the plurality of replication rules as pending, wherein each respective replication rule is further labeled with a first group identifier corresponding to the plurality of replication rules;
   upon receiving a request to predict an effect of the first group identifier, identifying, based on the plurality of replication rules, one or more objects of the plurality of objects; and
   outputting an indication of the one or more objects.

6. The method of claim 1, the method further comprising, prior to identifying the first object, validating the first replication rule based on one or more cross-dependencies.

7. The method of claim 1, further comprising outputting, via the GUI, an indication that at least a second object of the plurality of objects will have replication severed by the first replication rule.

8. A computer-readable storage medium having computer-readable program code embodied therewith, the computer-readable program code executable by one or more computer processors to perform an operation comprising:
   receiving, at a first node of a plurality of nodes, a first replication rule, wherein the first replication rule defines object replication among the plurality of nodes;
   labeling the first replication rule as pending, wherein a second replication rule on the first node is labeled as active;
   upon receiving a request to predict an effect of the first replication rule:
      identifying, based on the first replication rule, a first object of a plurality of objects;
      upon determining that the first object is present on the first node but is not present on a second node of the plurality of nodes, outputting an indication of the first object, to a user, on a graphical user interface (GUI);
      determining an amount of data that will be affected by the first replication rule, the amount of data including at least a size of the first object; and
      outputting an indication of the amount of data, to the user, on the GUI; and
   upon receiving, via the GUI, user approval of the first replication rule, labeling the first replication rule as active.

9. The computer-readable storage medium of claim 8, the operation further comprising:
   upon labeling the first replication rule as active, replicating the first object to the second node.

10. The computer-readable storage medium of claim 8, the operation further comprising replicating the first replication rule to the second node of the plurality of nodes.

11. The computer-readable storage medium of claim 10, the operation further comprising:
   upon receiving the request to predict the effect of the first replication rule:
      forwarding, to the second node, the request to predict the effect of the first replication rule;
      receiving, from the second node, an indication of a second object that is present on the second node;
      determining that the second object is not present on the first node; and
      outputting an indication of the second object.

12. The computer-readable storage medium of claim 8, the operation further comprising:
   receiving a plurality of replication rules;
   labeling each respective replication rule of the plurality of replication rules as pending, wherein each respective replication rule is further labeled with a first group identifier corresponding to the plurality of replication rules;

upon receiving a request to predict an effect of the first group identifier, identifying, based on the plurality of replication rules, one or more objects of the plurality of objects; and outputting an indication of the one or more objects.

13. The computer-readable storage medium of claim 8, the operation further comprising, prior to identifying the first object, validating the first replication rule based on one or more cross-dependencies.

14. The computer-readable storage medium of claim 8, the operation further comprising outputting, via the GUI, an indication that at least a second object of the plurality of objects will have replication severed by the first replication rule.

15. A system comprising:

one or more computer processors; and a memory containing a program which when executed by the one or more computer processors performs an operation, the operation comprising:

receiving, at a first node of a plurality of nodes, a first replication rule, wherein the first replication rule defines object replication among the plurality of nodes;

labeling the first replication rule as pending, wherein a second replication rule on the first node is labeled as active;

upon receiving a request to predict an effect of the first replication rule:

identifying, based on the first replication rule, a first object of a plurality of objects;

upon determining that the first object is present on the first node but is not present on a second node of the plurality of nodes, outputting an indication of the first object, to a user, on a graphical user interface (GUI);

determining an amount of data that will be affected by the first replication rule, the amount of data including at least a size of the first object; and outputting an indication of the amount of data, to the user, on the GUI; and upon receiving, via the GUI, user approval of the first replication rule, labeling the first replication rule as active.

16. The system of claim 15, the operation further comprising:

upon labeling the first replication rule as active, replicating the first object to the second node.

17. The system of claim 15, the operation further comprising:

replicating the first replication rule to the second node of the plurality of nodes; and upon receiving the request to predict the effect of the first replication rule:

forwarding, to the second node, the request to predict the effect of the first replication rule;

receiving, from the second node, an indication of a second object that is present on the second node;

determining that the second object is not present on the first node; and outputting an indication of the second object.

18. The system of claim 15, the operation further comprising:

receiving a plurality of replication rules;

labeling each respective replication rule of the plurality of replication rules as pending, wherein each respective replication rule is further labeled with a first group identifier corresponding to the plurality of replication rules;

upon receiving a request to predict an effect of the first group identifier, identifying, based on the plurality of replication rules, one or more objects of the plurality of objects; and outputting an indication of the one or more objects.

19. The system of claim 15, the operation further comprising, prior to identifying the first object, validating the first replication rule based on one or more cross-dependencies.

20. The system of claim 15, the operation further comprising outputting, via the GUI, an indication that at least a second object of the plurality of objects will have replication severed by the first replication rule.

* * * * *